July 5, 1949.　　　M. N. YARDENY　　　2,475,272
SPEED CONTROL APPARATUS

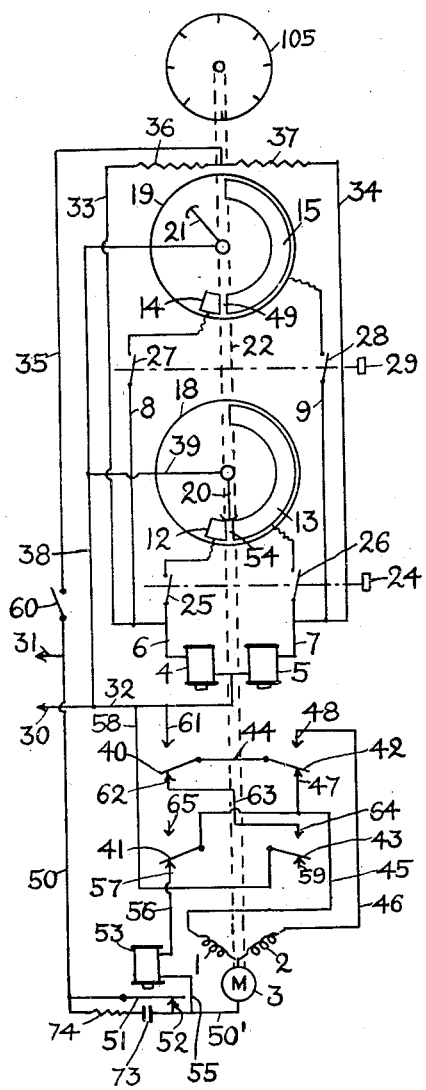

Filed Jan. 1, 1944　　　　　　　　　4 Sheets-Sheet 2

MICHEL N. YARDENY
INVENTOR

BY John P. Nikonow
ATTORNEY

July 5, 1949.    M. N. YARDENY    2,475,272
SPEED CONTROL APPARATUS
Filed Jan. 1, 1944    4 Sheets-Sheet 3

Michel N. Yardeny
INVENTOR

BY John P. Wilsonon
ATTORNEY

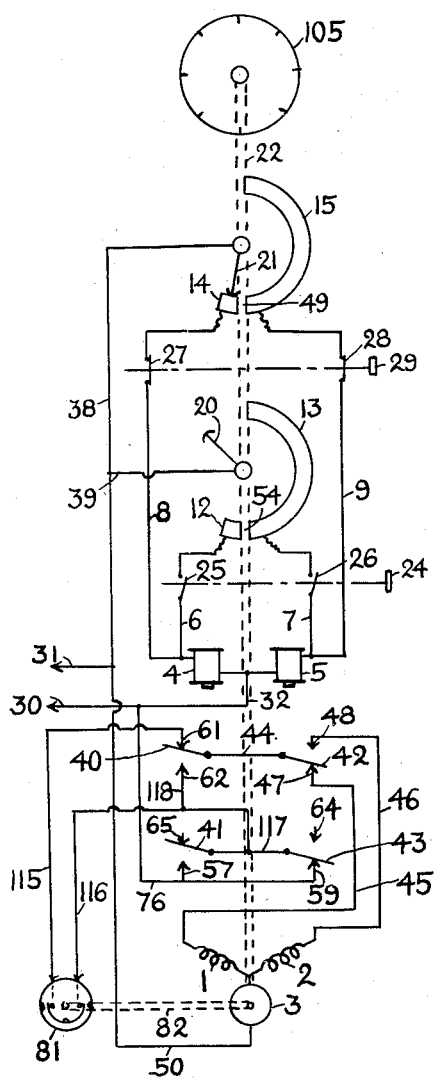
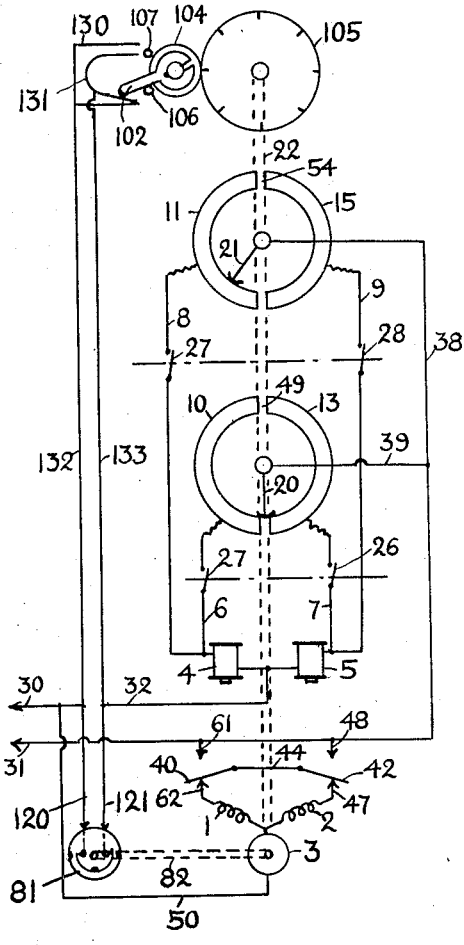

Patented July 5, 1949

2,475,272

UNITED STATES PATENT OFFICE 2,475,272

SPEED CONTROL APPARATUS

Michel N. Yardeny, New York, N. Y.

Application January 1, 1944, Serial No. 516,680

1 Claim. (Cl. 318—31)

My invention relates to control apparatus and has particular reference to apparatus for controlling a motor or other suitable driving means at a distance.

My invention has further reference to apparatus in which reversible driving means such as a reversible electric motor is used for accurately positioning a movable object, the control being accomplished by relatively movable control elements which determine direction of rotation and stop or otherwise affect the driving means when a neutral or stopping point is reached by one of the control elements.

In apparatus of this type it is important to prevent oscillations or hunting of the driving means when the stopping position is reached. I have already disclosed certain devices for this purpose in my copending application Serial No. 357,660, filed September 20, 1940, now Patent 2,342,717, issued February 29, 1944. My present invention has for its object to provide additional effective means to suppress or stop hunting of the driving means or of the control elements operated by the driving means when the stopping position is reached.

I have found that the driving means is effectively prevented from hunting when its rotation or other movement is materially slowed down when the control elements reach or approach the neutral point or stopping position. In my copending application Serial No. 513,731, filed December 10, 1943, I described certain arrangements for changing the speed of a motor when the control elements approach the neutral point, the change of speed being accomplished by so changing motor connections that a stronger magnetic field is produced at a certain point near the stopping position, the motor being thereby retarded in its rotation. I have now found that the motor hunting is very effectively suppressed if the motor current is rapidly interrupted by a suitable vibrating or interrupting device.

In one embodiment of my invention I provide for this purpose an electromagnetic vibrator whose rate of vibrations can be adjusted for obtaining the best results.

In a modified apparatus I provide a governor-type mechanical or rotary interrupter operated by the motor whose rate of interruptions and the thereby obtained change of speed of the motor can also be regulated or adjusted.

Another object of my invention is to provide means to render the interrupting device operative when the control elements approach the stopping position for the motor. In one embodiment of my invention I provide for this purpose a reversing switch which connects the vibrating or interrupting device in circuit with the motor when the motor rotation is reversed after passing the stopping position. Such reversing switches have already been disclosed in my application Serial No. 513,731, filed December 10, 1943.

In another modification of my apparatus I provide control elements of a special type in which a contact member is provided for connecting the interrupting element in circuit when the control elements approach the stopping position from a certain direction. Such an arrangement has been disclosed in my copending application Serial No. 513,731, filed December 10, 1943, also in applications No. 477,469, filed February 27, 1943 and No. 509,555, filed November 9, 1943, now abandoned.

Other objects and advantages of my invention will be apparent from the more complete disclosure contained in the accompanying specification and drawings in which—

Fig. 1 is a diagrammatic view of one embodiment of my invention in which an electromagnetic vibrator is used in connection with a special contact point at the control elements, the system being applied to a series wound motor.

Fig. 2 is a similar view of a system employing a shunt wound motor having provision for dynamic braking when the motor is stopped.

Fig. 5 is a detail view of an adjustable electromagnetic vibrator.

Fig. 6 is a detail view of a rotary interrupter;

Fig. 7 is another view of the rotary interrupter;

Fig. 10 is a similar view of a modified system with a rotary governor;

Fig. 11 is a similar view of a system with a governor in the relay circuit;

Figure 3:
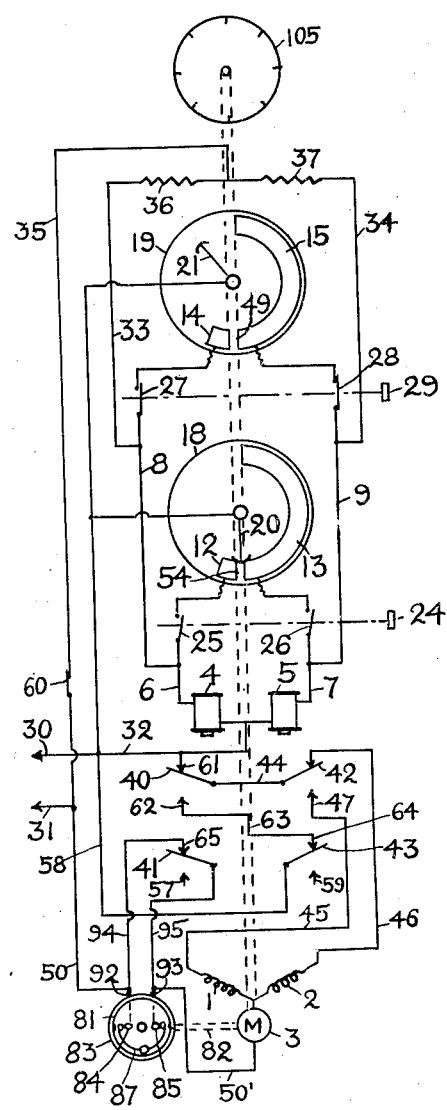
Fig. 3 is a similar view of a modified system in which a rotary interrupter is used in connection with a series wound motor.

The embodiment of my apparatus shown in Fig. 1 comprises a series wound motor having reversing windings 1 and 2 and an armature 3. The motor is controlled by relay coils 4 and 5 connected by leads 6, 7 and 8, 9 with control units of which two are shown on the drawing. Each control unit comprises a pair of conducting segments 12, 13 and 14, 15 respectively, separated by gaps 49 and 54 respectively mounted on insulation discs 18, 19 and engaged by contact arms 20, 21 mounted on a shaft 22 operatively connected with the armature 3. The relay coils can be connected with either of the control units by closing switches 25, 26 and 27, 28, operated by handles 24, 29.

The coils 4, 5 are connected with a terminal 30 of a source of current by a lead 32 and with a terminal 31 by leads 33, 34 and a common lead 35, resistors or other impedances 36, 37 being included in the circuit.

The contact arms 20, 21 are connected with the terminal 30 by leads 38 and 39 respectively so that one or the other of the coils 4, 5, is short circuited and deenergized when a contact arm engages one of the corresponding segments. Both coils are short circuited when the two segments of a pair of segments are bridged by the corresponding contact arm. Both coils are energized when an energized contact arm is placed on the insulation disc itself.

The relays actuate contact arms 40, 41, 42 and 43 which control the motor connections.

The motor windings 1, 2 are connected by leads 45, 46 with relay contact points 47, 48, the armature being connected by leads 50', 50 with the terminal 31. The lead 45 is also connected with the arm 41. The leads 50', 50 include an arm 51 with a contact point 52 of a vibrator which is shown more in detail in Fig. 5. The vibrator is provided with a coil 53 connected by a lead 55 with the lead 50' and by a lead 56 with a relay contact point 57.

The arm 40, when attracted by the coil 4, engages a point 61, and when released engages a point 62, connected by a lead 63 with a point 64. The arm 41, when attracted by the coil 4, engages a blind point 65. The arm 43 is connected by a lead 58 with the lead 32.

If a switch 60 is closed and switch contacts 25, 26 are closed, both relays will be connected in a circuit with the source of current through the resistors 36, 37 and leads 32, 6, 7, 33, 34, and 35. The coils 4, 5 will remain deenergized, however, if as shown one of the contact arms, such as 20, engages both segments 12 and 13, bridging the gap 54 and short circuiting the coils through the leads 6, 7, switch contacts 25, 26, arm 20, and leads 39, 30 and 32. Switches 25, 26 and 27, 28 are preferably so mechanically coupled that the selected switches remain closed until the handle of the other pair of switches is operated and that closing of a pair of switches automatically opens the previously closed switches while the switches last operated, for example switches 25, 26 remain closed. The corresponding contact arm will remain in the stopping position for the motor, i. e., bridging the gap between the corresponding segments. Both relays are deenergized although the circuit is not completely interrupted, current continuing to flow through the resistors 36, 37. The motor is disconnected from the source of current.

If the switch handle 29 is operated, switch contacts 27, 28 are closed, while switches 25, 26 will be automatically released. Since the arm 21, as shown, engages the insulated portion of the disc 19, no current will flow through the control elements and both relay coils will be energized through resistors 36, 37.

The coils 4, 5 being energized, their arms 40, 41, 42 and 43 will be raised. Current therefore will flow from the terminal 30 through lead 32, point 61, arm 40, connecting lead 44, arm 42, point 48, lead 46, winding 2, armature 3, lead 50', point 52, arm 51, and lead 50 to the terminal 31. The motor will rotate, causing the arm 21 to move counter-clockwise toward the gap 49 between the segments 14 and 15.

When the segment 14 is reached by the arm 21 the coil 4 will be short circuited and both arms 40, 41 will return to the points 62 and 57 respectively. Current will then flow from the terminal 30 through the leads 32, 58, arm 43, point 64, lead 63, point 62, arm 40, lead 44, arm 42, point 48, lead 46, winding 2, armature 3, lead 50', point 52, arm 51 and lead 50 to the terminal 31. At the same time current will flow from the winding 2 through the winding 1, lead 45, arm 41, point 57, lead 56, coil 53, leads 55, 50', point 52, arm 51, and lead 50 to terminal 31. The vibrator coil 53 will be energized, attracting the arm 51 and interrupting the main current to the motor and its own current. The coil 53 will be therefore alternately energized and deenergized, causing the current to the motor to pulsate, thereby materially reducing the motor speed. The contact arm 21, therefore, will approach the gap at a reduced speed, thus greatly facilitating the stoppage of the motor when the gap is bridged and the relay coils are deenergized.

If the contact arm 21 engages the segment 15, coil 5 will be deenergized releasing its arms 42, 43, coil 4 remaining energized with the result that current will flow from the terminal 30 through the lead 32, point 61, arm 40, lead 44, arm 42, point 47, lead 45, winding 1, armature 3, lead 50', to the point 52, arm 51 and lead 50 to terminal 31 causing the motor to rotate in the opposite direction. Upon crossing or overrunning the gap, the arm 21 will engage the short segment 14 and will return to the gap at a reduced speed as previously explained, enabling the motor to stop rapidly.

A useful load or an indicating disc 105 may be connected to shaft 22.

The rate of oscillations or pulsation of the current can be regulated by adjusting a screw 70, (Fig. 5) or by adjusting position of a weight 71 for changing the natural frequency of the arm 51.

A condenser 73 and a resistor 74 may be connected across the point 52 and arm 51 to suppress arcing or sparking. Similar arrangements may be provided for the relay contact points.

A vibrator, according to my invention, can be used with various motor control systems, its application to a shunt motor is shown in Fig. 2. The motor has a shunt winding 75 connected by leads 50, 67, 76, with the terminals 31, 30 respectively. The armature 77 is connected with the arms 41, 43, which normally engage points 57 and 59, the point 57 being connected to the lead 50, and point 59 being connected by a lead 78 to the point 47. The vibrator coil 53 is connected by a lead 79 to the point 48, and by a lead 80 to the lead 72.

The relays 4, 5 are shown without the short circuiting arrangement of Fig. 1 and are normally deenergized. One or the other coil is energized when the arm 20 or 21 engages one of the corresponding segments and the corresponding switch 24 or 29 is closed. The vibrator coil 53 is energized only when segment 12 or 14 is engaged by a contact arm 20, 21 respectively, energizing the coil 5. Current then flows from the terminal 30 through the lead 32, lead 76, point 64, arm 43, armature 77, arm 41, point 57, lead 72, point 52, arm 51, and lead 50 to the terminal 31, causing the motor to rotate. At the same time current will also flow from the terminal 30 through the lead 32, point 62, arm 40, lead 44, arm 42, point 48, lead 79, vibrator coil 53, leads 80, point 52, arm 51, and lead 50, to the terminal 31. The vibrator will interrupt the current at a rate determined by its adjustment, thereby reducing the speed of the motor thus facilitating stopping of the motor when the gap is bridged by the energized contact arm 20 or 21.

For the proper operation of the vibrating interrupter it is desirable to keep the rate of vibrations sufficiently low since otherwise the inductive impedance of the motor may be too high for its operation. The resilient arm 51 may be lengthened for this purpose. It is also possible to vary the proportion of the energy component in each vibration cycle by adjusting the screw 70 so as to allow a certain deflection of arm 51 under action of the inertia of the weight 71 (Fig. 5). The time of the interruption of the current may be thus made more or less shorter than the time of oscillation of the weight 71.

A rotary centrifugal governor may be used for interrupting the motor current as shown in Fig. 3, which represents a control system similar to the system of Fig. 1. However, relays 4 and 5 are shown energized, switches 60 and 29 being closed. The governor or rotary interrupter, shown in detail in Fig. 6, comprises a block 81, preferably made of an insulating material, suitably mounted on a shaft 82, operatively connected with the armature 3 of the motor. The block is provided with slip rings 83 connected each with one of contact points 84, 85. The contact points are normally engaged by the ends of a semi-circular spring 87 supported at 88 on the block 81. Tension of the spring 87 can be adjusted by screws 90 in posts 91. Current is conducted to the slip rings by brushes 92, 93 connected with leads 50, 50' at the motor circuit, and with leads 94, 95, extending to the point 65 and arm 41.

Figure 13:
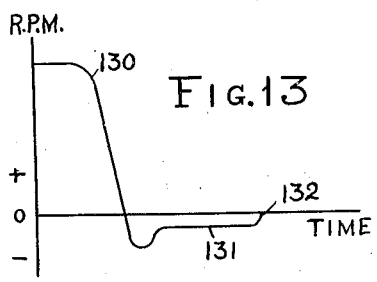
Fig. 13 is a diagram of motor speeds under control of the governor.

The governor contacts 84, 85 normally remain short circuited by the spring 87 and, also, by the arm 41 of coil 4 engaging the point 65. The governor thereby remains inoperative when the control arm 20 or 21 engages the insulation on the disc 18 or 19, or the large segment 13 or 15, or both segments. Only when one of the short segments 12 or 14 is engaged by the corresponding contact arm, will the coil 4 be deenergized, releasing the arm 41, which will then engage the blind point 57. The main current of the motor will pass through the points 84, 85 and spring 87 as long as the motor speed is below a certain limiting value. The tension and length of the spring 87 may be adjusted and chosen so that the current can be interrupted at a fraction of the normal motor speed to facilitate very low speed operation. The spring 87 deflects in the radial direction, in which the centrifugal force also acts, thereby utilizing this force at maximum extent. The motor speed then will be continuously checked by being interrupted when the spring 87 leaves the contact points 84, 85 under action of the centrifugal force. As a result, the motor will receive intermittent energy impulses and will rotate at a low average speed which will be entirely independent of the normal motor speed and regardless of the type of the motor used or whether it is designed for D. C. or A. C. current. Ratio of the energy impulses to the off-current periods may be selected by proportioning the length and resiliency of the spring 87 so as to cause the motor to stop when the contact member is in the neutral point. Additional contact points 16 connected with the rings 83 may be provided on the body 81 for maintaining the circuit closed at normal high speeds. These points will therefore enable the motor to remain energized for reversal of rotation as soon as the contact arm passes at high speed over the gap to the next segment and the coil 4 is deenergized and releases the arm 41. When the motor is stopped and reversed, the spring 87 will engage the inner contact points 84, 85 being so adjusted as to keep the motor speed down. When the contact arm 20 or 21 returns to the gap due to the reversal of the motor, the motor will rotate very slowly, coming to a stop when the gap is bridged. As shown in Fig. 13, the motor speed, indicated by the curve 130, drops from its maximum value to zero after reversal of the motor windings, and then settles to a low value 131 under control of the governor until stopped at 132.

Figure 4:
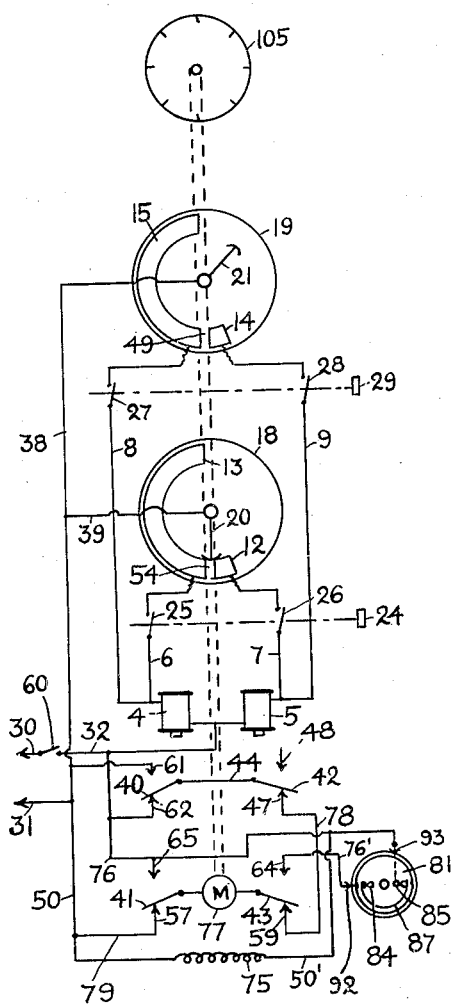
Fig. 4 is a similar view of a system with a rotary interrupter employing a shunt wound motor.

A modified arrangement is shown in Fig. 4 in which a shunt wound motor is employed, the system being similar to the system of Fig. 2. The governor 81 is connected with leads 76, 76' and is disconnected as long as the point 64 is not engaged by the arm 43. When the short segment 12 or 14 is engaged by a contact arm 20 or 21 and coil 5 is energized, the current will flow from the terminal 30 through the leads 32, 76, governor contact points, lead 76', point 64, arm 43, armature 77, arm 41, point 57 and leads 79, 50 to the terminal 31. The governor will hold the motor speed down to a predetermined number of revolutions per minute until the motor is stopped when the gap between the energized segments is bridged by the contact member. As soon as the gap is bridged, coil 4 will be energized too. Arms 41 and 43 are attracted and short circuit the armature. The resultant strong current through the armature will dynamically brake the rotation, positively stopping the armature since the contact points 84, 85 of the governor will remain connected by spring 87 below a certain low speed. The fact, therefore, that the governor is included into the armature short circuiting lead 76, will not affect the dynamic braking when the gap is bridged.

Figure 8:
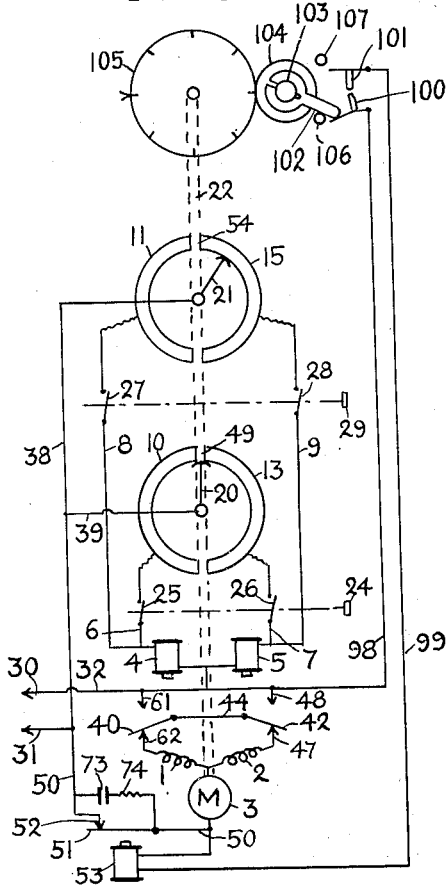
Fig. 8 is a diagrammatic view of a system employing an electromagnetic vibrator controlled by a reversing switch.

The circuit interrupting device such as vibrator 53 can be also made operative by the reversal of the motor rotation for a limited time by a special reversing switch as shown in Fig. 8. In this arrangement the motor is connected for operation in one or the other direction by relay coils 4 and 5, current for the motor passing through the interrupter arm 51 and contact point 52 when one of the coils 4 or 5 is energized. The coil 53 is connected in series with the interrupter arm 51 by leads 98, 99 and switch points 100, 101. These points are normally held separated by an arm 102, frictionally mounted on a shaft 103. The latter mounts a friction wheel 104, engaging indicating wheel 105, on the shaft 22. The shaft 103 is therefore continuously rotated in one or the other direction by the shaft 22, the movements of the arm 102, however, being limited by stops 106, 107. Normally the arm 102 rests against one or the other of the stops, holding the corresponding contact point separated from the other. During the reversal of rotation, however, when the contact arm 20 or 21 passes over the gap between energized segments 10, 13 or 11, 15, the contact points 100, 101 remain closed while the arm 102 moves from one stop to the other and until it engages the other stop. During this time coil 53 is energized and causes the arm 51 to vibrate, interrupting the main current for the motor, thus reducing the speed of the motor.

Figure 9:
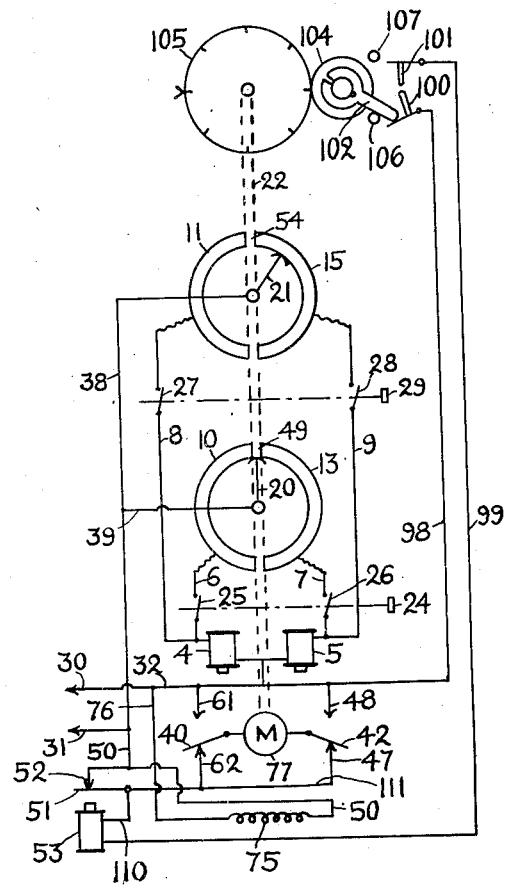
Fig. 9 is a similar view of a system with a reversing switch and shunt motor with dynamic braking.

A similar arrangement is shown in Fig. 9 in application to a shunt wound motor 77. The coil 53 is connected by leads 98, 99 with the terminal 30, and by line 110, 76 with the terminal 31. The motor circuit is periodically interrupted by the arm 51 between leads 50 and 111, during the reversal of the motor rotation.

A modified system is shown in Fig. 10 in which a series wound motor is used, and the rotary governor or vibrator 81 is so connected that it interrupts the main motor circuit when a short segment 12 or 14 is engaged. The governor for this purpose is connected by a lead 115 to point 61 and by a lead 116 to a lead 117, connecting relay arms 41 and 43.

When, as shown, contacts, 27, 28 are closed and arm 21 engages segment 14, relay coil 4 is energized. Current will then flow from the terminal 30 through leads 32, 76, point 59, arm 43, leads 117, 116, governor 81, lead 115, point 61, arm 40, lead 44, arm 42, point 47, lead 45, winding 1, armature 3 and lead 50 to the terminal 31. The current through the motor will be periodically interrupted by interrupter 81 reducing the amount of energy delivered to the motor and retarding the motor rotation until the motor is deenergized and stopped by both the coils 4 and 5 being energized when the gap is bridged, the motor current then being interrupted at points 47 and 62.

Another modification is shown in Fig. 11 in which the rotary interrupter or governor 81 is connected in the relay circuit by leads 120, 121 and by leads 132, 133 to U-shaped contact members 130, 131 which are normally closed by the arm 102 and are opened for a limited time while the arm 102 moves from stop 106 to stop 107. Such an interrupter arrangement is advantageous under certain conditions when it is not desired to interrupt the motor circuit by the rotary switch or by the electromagnetic vibrator, thereby avoiding sparking or arcing at the points of the interrupter.

Figure 12:
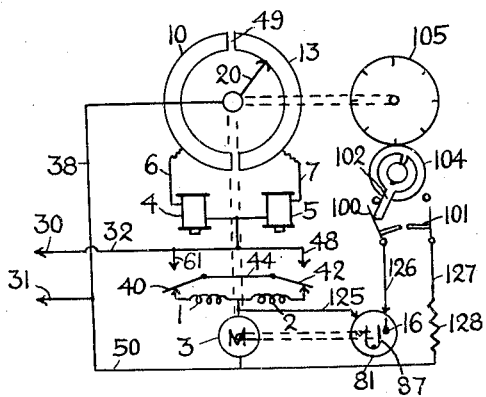
Fig. 12 is a similar view of a system with a governor in parallel with the armature of the motor.

The interrupter can be also connected in parallel with the armature of the motor as shown in Fig. 12. One contact point of the governor 81 is connected by a lead 125 with one terminal of the armature 3, the other being connected by a lead 126 with one contact point 100, the other contact point 101 being connected by a lead 127 with the other armature terminal through a resistor 128. The governor 81 in this case is provided only with the outer contact points 16 so that the spring 87 short circuits the armature at high speeds and opens the circuit at low speeds during reversal of the motor. Speed of the motor is thereby prevented from rising after the reversal and before the contact arm reaches the gap.

It will be understood that the various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claim to cover all such changes and modifications.

What is claimed as new and desired to be secured by Letters Patent is:

In control apparatus for placing a load in a desired position, in combination, a pair of relatively movable members, one of the members having electrical conducting elements and a neutral point, the other member having a contact element engageable with one or the other of the said conducting elements depending upon the desired direction of load movement, drive means including a motor for moving the load, one of the said pair of members being pre-set to displace the said neutral point and contact element according to the desired load position, means under control of the load motor for moving the other member to cause alignment of said contact element and neutral point to stop the motor, the said member overrunning beyond the neutral point into engagement with the other conducting element to cause a reversal of motor rotation, an electric rotary governor for periodically interrupting the current to the said load motor, a pair of parallel circuits short-circuiting the said governor, switch means at the terminals of both said circuits, a rotary member frictionally driven from the load motor and adapted to engage the said switches, and stop means associated with the said switches and rotary member for limiting the movement of the rotary member in one direction of motor rotation to close one of the said short-circuiting switches, and to close the other of said switches in the opposite direction of motor rotation to render the said governor effective to reduce speed of motor rotation.

MICHEL N. YARDENY.

REFERENCES CITED

The following references are of record in the file of this patent:

UNITED STATES PATENTS

| Number | Name | Date |
| --- | --- | --- |
| 129,085 | Barjon | July 16, 1872 |
| 248,434 | Edison | Oct. 18, 1881 |
| 932,031 | Krone et al. | Aug. 24, 1909 |
| 1,066,678 | Sundh | July 8, 1913 |
| 1,784,504 | Tanner | Dec. 9, 1930 |
| 1,898,182 | Harrison | Feb. 21, 1933 |
| 1,983,429 | Albright | Dec. 4, 1934 |
| 2,109,776 | Johnson | Mar. 1, 1938 |
| 2,115,834 | Young | May 3, 1938 |
| 2,124,684 | Behr et al. | July 26, 1938 |
| 2,195,287 | Schaefer | Mar. 26, 1940 |
| 2,331,354 | Stout | Oct. 12, 1943 |